(12) United States Patent
Liu et al.

(10) Patent No.: US 8,185,828 B2
(45) Date of Patent: May 22, 2012

(54) EFFICIENTLY SHARING WINDOWS DURING ONLINE COLLABORATIVE COMPUTING SESSIONS

(75) Inventors: Guangbing Liu, Sunnyvale, CA (US); Hailei Sheng, Fremont, CA (US); Jiannong Gu, Sunnyvale, CA (US); He Huang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 451 days.

(21) Appl. No.: 12/420,497

(22) Filed: Apr. 8, 2009

(65) Prior Publication Data

US 2010/0262925 A1    Oct. 14, 2010

(51) Int. Cl.
*G06F 3/00* (2006.01)
*G06F 3/048* (2006.01)
(52) U.S. Cl. ........................... 715/753; 715/759
(58) Field of Classification Search .................. 715/759, 715/753
See application file for complete search history.

(56) References Cited

U.S. PATENT DOCUMENTS

| | | | |
|---|---|---|---|
| 5,522,025 A | 5/1996 | Rosenstein | |
| 5,577,188 A | 11/1996 | Zhu | |
| 5,623,603 A | 4/1997 | Jiang et al. | |
| 5,758,110 A * | 5/1998 | Boss et al. | 715/751 |
| 5,760,769 A * | 6/1998 | Petrie | 715/759 |
| 5,805,846 A | 9/1998 | Nakajima et al. | |
| 5,844,553 A | 12/1998 | Hao et al. | |
| 5,872,924 A * | 2/1999 | Nakayama et al. | 709/205 |
| 5,944,791 A | 8/1999 | Scherpbier | |
| 6,167,432 A | 12/2000 | Jiang | |
| 6,295,551 B1 | 9/2001 | Roberts et al. | |
| 6,308,199 B1 | 10/2001 | Katsurabayashi | |
| 6,343,313 B1 | 1/2002 | Salesky et al. | |
| 6,567,813 B1 | 5/2003 | Zhu et al. | |
| 6,570,590 B1 | 5/2003 | Dubrow et al. | |
| 6,601,087 B1 | 7/2003 | Zhu et al. | |
| 6,654,032 B1 | 11/2003 | Zhu et al. | |
| 6,674,992 B2 | 1/2004 | Helmick et al. | |
| 6,691,154 B1 | 2/2004 | Zhu et al. | |
| 6,694,379 B1 | 2/2004 | Hanko et al. | |
| 6,754,693 B1 | 6/2004 | Roberts et al. | |
| 6,763,501 B1 | 7/2004 | Zhu et al. | |
| 6,789,119 B1 | 9/2004 | Zhu et al. | |
| 6,901,448 B2 | 5/2005 | Zhu et al. | |
| 6,911,987 B1 | 6/2005 | Mairs et al. | |
| 6,925,645 B2 | 8/2005 | Zhu et al. | |
| 7,069,298 B2 | 6/2006 | Zhu et al. | |
| 7,096,272 B1 | 8/2006 | Raman | |
| 7,130,883 B2 | 10/2006 | Zhu et al. | |
| 7,203,755 B2 | 4/2007 | Zhu et al. | |
| 7,213,051 B2 | 5/2007 | Zhu et al. | |
| 7,216,172 B2 | 5/2007 | Yang et al. | |
| 7,353,253 B1 | 4/2008 | Zhao | |

(Continued)

*Primary Examiner* — Doon Chow
*Assistant Examiner* — Wilson Varga

(57) ABSTRACT

In one embodiment, a presenter device may determine displayed windows of applications, and may provide individual window sharing selectability (e.g., shared or unshared), as well as entire application sharing selectability (shared, unshared, or neither). In particular, the entire application sharing selectability takes priority over individual window sharing selections (i.e., all windows of shared applications are shared and all windows of unshared applications are unshared). Based on individual window sharing selections and entire application sharing selections, a set of presenter device windows that are to be shared with the attendee devices may be determined, as well as a set of unshared windows that are not to be shared with the attendee devices, and the presenter device may share the set of shared windows with the attendee devices, without sharing the set of unshared windows.

24 Claims, 12 Drawing Sheets

LIST 700

| APPLICATION NAME 705 | APPLICATION SHARING SELECTION 710 | WINDOW NAME 715 | WINDOW SHARING SELECTION 720 | CHILD WINDOW NAME 725 | CHILD WINDOW SHARING SELECTION 730 |
|---|---|---|---|---|---|
| APPLICATION 1 | — | WINDOW 1 | YES | 1A | YES |
|  |  | WINDOW 2 | NO | 1B | NO |
| APPLICATION 2 | NO | WINDOW 1 | ALL NO | — | — |
|  |  | WINDOW 2 | ALL NO | — | — |
| APPLICATION 3 | YES | WINDOW 1 | ALL YES | — | — |
|  |  | WINDOW 2 | ALL YES | — | — |
|  |  | WINDOW 3 | ALL YES | 3A | YES |
| APPLICATION 4 | — | WINDOW 1 | ALL NO | 4A | NO |
| ⋮ | ⋮ | ⋮ | ⋮ |  |  |

ENTRIES 750

U.S. PATENT DOCUMENTS

| | | |
|---|---|---|
| 7,418,664 B2 * | 8/2008 | Ben-Shachar et al. ........ 715/753 |
| 7,421,469 B1 | 9/2008 | Liu et al. |
| 7,461,347 B2 | 12/2008 | Zhu et al. |
| 7,464,137 B2 | 12/2008 | Zhu et al. |
| 7,484,115 B2 | 1/2009 | Zhu et al. |
| 7,499,972 B1 | 3/2009 | Buonanno et al. |
| 2002/0165922 A1 | 11/2002 | Wei |
| 2002/0174181 A1 | 11/2002 | Wei |
| 2003/0085922 A1 * | 5/2003 | Wei ............................... 345/751 |
| 2003/0164853 A1 | 9/2003 | Zhu et al. |
| 2003/0167301 A1 | 9/2003 | Zhu et al. |
| 2003/0167302 A1 | 9/2003 | Zhu et al. |
| 2003/0167304 A1 | 9/2003 | Zhu et al. |
| 2003/0167418 A1 | 9/2003 | Zhu et al. |
| 2003/0182375 A1 | 9/2003 | Zhu et al. |
| 2003/0189601 A1 | 10/2003 | Ben-Shachar et al. |
| 2004/0024890 A1 * | 2/2004 | Baek et al. .................... 709/229 |
| 2005/0004977 A1 | 1/2005 | Roberts et al. |
| 2005/0033817 A1 * | 2/2005 | Wei ............................... 709/208 |
| 2006/0092269 A1 | 5/2006 | Baird et al. |
| 2006/0161623 A1 * | 7/2006 | Montgomery et al. ....... 709/204 |
| 2006/0161624 A1 * | 7/2006 | Montgomery et al. ....... 709/204 |
| 2006/0168533 A1 * | 7/2006 | Yip et al. ...................... 715/753 |
| 2006/0248144 A1 | 11/2006 | Zhu et al. |
| 2007/0022159 A1 | 1/2007 | Zhu et al. |
| 2007/0150583 A1 | 6/2007 | Asthana et al. |

* cited by examiner

| APPLICATION NAME 705 | APPLICATION SHARING SELECTION 710 | WINDOW NAME 715 | WINDOW SHARING SELECTION 720 | CHILD WINDOW NAME 725 | CHILD WINDOW SHARING SELECTION 730 |
|---|---|---|---|---|---|
| APPLICATION 1 | — | WINDOW 1 | YES | 1A | YES |
| | | WINDOW 2 | NO | 1B | NO |
| APPLICATION 2 | NO | WINDOW 1 | ALL NO | — | — |
| | | WINDOW 2 | ALL NO | — | — |
| APPLICATION 3 | YES | WINDOW 1 | ALL YES | — | — |
| | | WINDOW 2 | ALL YES | — | — |
| | | WINDOW 3 | ALL YES | 3A | YES |
| APPLICATION 4 | — | WINDOW 1 | ALL NO | 4A | NO |
| ... | ... | ... | ... | | |

LIST 700

ENTRIES 750

FIG. 7A

```
┌─────────────────────────────────────────────────────┐
│        SHARING SELECTION LIST (ALTERNATE VIEW)      │
│                         700                         │
├─────────────────────────────────────────────────────┤
│                                                     │
│  APPLICATION 1 (--)                                 │
│       - WINDOW 1 (-SHARED/unshared/all shared/all unshared-)
│            * CHILD WINDOW 1A (-SHARED/unshared-)  750
│            * CHILD WINDOW 1B (-shared/UNSHARED-)    │
│       - WINDOW 2 (-shared/UNSHARED/all shared/all unshared -)
│                                                     │
│  APPLICATION 2 (-UNSHARED-)                         │
│       - WINDOW 1 (-ALL UNSHARED-)                   │
│       - WINDOW 2 (-ALL UNSHARED-)                   │
│                                                     │
│  APPLICATION 3 (-SHARED-)                           │
│       - WINDOW 1 (-ALL SHARED-)                     │
│       - WINDOW 2 (-ALL SHARED-)                     │
│       - WINDOW 3 (-ALL SHARED-)                     │
│            * CHILD WINDOW 3A (-SHARED-)             │
│                                                     │
│  APPLICATION 4 (--)                                 │
│       - WINDOW 1 (-shared/unshared/all shared/ALL UNSHARED-)
│            * CHILD WINDOW 4A (-UNSHARED-)           │
│                                                     │
└─────────────────────────────────────────────────────┘
```

ENTRIES 750

EFFICIENTLY SHARING WINDOWS DURING ONLINE COLLABORATIVE COMPUTING SESSIONS

TECHNICAL FIELD

The present disclosure relates generally to computer networks, and, more particularly, to online collaborative computing sessions.

BACKGROUND

Online collaborative computing sessions, such as interactive conferences (e.g., conferences/meetings), may be supported by a network of servers and client computers. In particular, one feature available to online meetings or data conferencing systems is to allow computer users at different locations to communicate via a computer network and share applications stored and/or executed on one of the users computers, such as through a software program that enables the users to share applications (e.g., sharing a presenter's application with one or more attendees/viewers).

A conventional technique for sharing applications during a data conference is to share a predefined area of the presenter's computer screen with an attendee (e.g., "desktop sharing"). Using this technique, the presenter's computer captures an image within a predefined portion of the presenter's computer screen/display (e.g., the entire screen or a portion of the screen). The captured image within the predefined portion of the presenter's computer screen is then transmitted to the attendee's computer for viewing. Thus, replicas of any windows that are displayed within the predefined portion of the presenter's computer screen are displayed on the attendee's computer screen. A refinement to this conventional technique allows the presenter to selectively share an application with the attendee (e.g., "application sharing"). In particular, only those windows of a shared application may be seen by the attendees. Thus, windows of non-shared applications placed within the predefined portion of the presenter's computer screen may be blocked from the attendees.

BRIEF DESCRIPTION OF THE DRAWINGS

The embodiments described herein may be better understood by referring to the following description in conjunction with the accompanying drawings in which like reference numerals indicate identically or functionally similar elements, of which:

FIG. 7A illustrates an example list that may be used for application and individual window sharing;

FIG. 7B illustrates an alternate example list that may be used for application and individual window sharing;

DESCRIPTION OF EXAMPLE EMBODIMENTS

Overview

According to one or more embodiments of the disclosure, a presenter device may determine displayed windows of applications, and may generate a list of the windows. This list may be used to provide individual window sharing selectability (shared or unshared), as well as to provide entire application sharing selectability (shared, unshared, or neither shared nor unshared). In particular, the entire application sharing selectability takes priority over individual window sharing selections (i.e., all windows of a shared application are shared windows and all windows of an unshared application are unshared windows). Similarly, parent windows may be selected for sharing, and individual child windows may, though need not, be shared or not based on the parent window selection. Based on individual window sharing selections and entire application sharing selections within the list, a set of windows of the presenter device that are to be shared with the attendee devices may be determined, as well as a set of unshared windows that are not to be shared with the attendee devices, and the presenter device may share the set of shared windows with the attendee devices, without sharing the set of unshared windows.

DESCRIPTION

Architecture for Collaborative Computing Sessions

Figure 1:
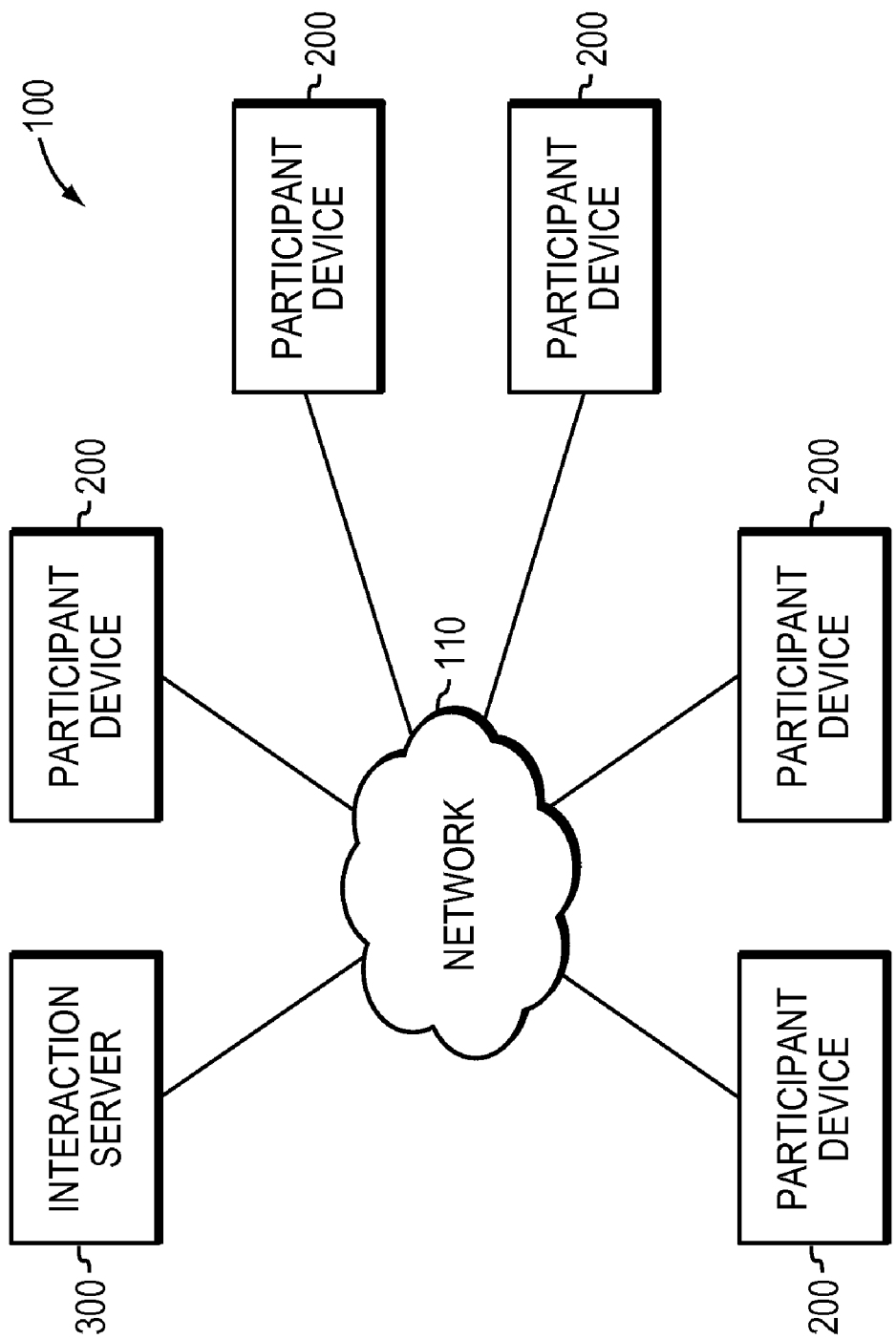
FIG. 1 illustrates an example computer network.

FIG. 1 is a schematic block diagram of an example computer network 100 illustratively comprising nodes/devices, such as one or more participant devices 200 and one or more interaction servers 300 interconnected by links/network 110 as shown and as described further herein. For instance, participant devices, as described below, may be a personal computer (PC) or one or more peripheral devices, such as phones, pagers, etc. Those skilled in the art will understand that any number of nodes, devices, links, etc. may be used in the computer network, and that the view shown herein is for simplicity.

In this environment, a number of participants may interact in an online, interactive, or collaborative setting. Such a setting can be for a meeting, training or education, support, or any other event that may require a number of participants to work together, interact, collaborate, or otherwise participate, such as web conferences, online meetings, etc. As used herein, the phrase "online collaborative computing session" may be used to describe these settings/events, particularly where a number of participant computers/devices collaborate in an established session, as may be appreciated by those skilled in the art. Also, as used herein, a "session" describes a generally lasting communication between one or more participant devices 200 through the interaction server 300. Those skilled in the art will understand that the session may be implemented/established using protocols and services provided by various layers (e.g., application, session, and/or transport layers) of a network protocol stack according to the well-known OSI model. Conversely, a "meeting" describes a personal layer of communication overlaid upon the session where participants/users communicate with each other. Moreover, while the terms "session" and "meeting" may generally be used interchangeably herein to denote a collaboration of people or devices, particular instances of their use may denote a particular distinction (e.g., a session may start with attendees joining/connecting to the servers, while a meeting may not start until a host/presenter joins the session), as may be understood by those skilled in the art.

In other words, a collaboration session comprises a plurality of devices or "participant devices," of which "attendee devices" are configured to view/receive content submitted or "shared" by "presenter devices." In some instances, the attendee devices are capable of modifying the content shared by the presenter device.

In particular, each participant (e.g., hosts/presenters and/or attendees) may operate a participant device 200. Each participant device 200 may comprise an electronic device with capability for visual and/or auditory presentation. Thus, a participant device 200 can be, for example, a desktop personal computer (PC), a laptop computer, a workstation, a personal digital assistant (PDA), a wireless telephone, a smart phone, an Internet television, and the like. Each participant device 200 supports communication by a respective participant, in the form of suitable input device (e.g., keyboard, mouse, stylus, keypad, etc.) and output device (e.g., monitor, display, speech, voice, or other device supporting the presentation of audible/visual information). Each participant device may be interconnected with a suitable communications network 110 such as, for example, the Internet, and may appear as a client computer thereon.

In one embodiment, each participant device 200 may operate under the control of a suitable operating system (OS) (e.g., WINDOWS, UNIX, etc.) to run software applications (e.g., in the form of code modules) which may be installed, received, or downloaded. At least some of these software applications may support specific functions, such as, for example, functions related to the online, interactive meeting (a collaborative computing session), such as conventional web browser programs that allow convenient access and navigation of the Internet (e.g., the World Wide Web).

The online meeting (collaborative computing session) of the various participants may be supported by an interaction server 300 which may be maintained or operated by one or more of the participants and/or a third-party service provider. The interaction server 300 may be a computer system that is connected to network 110, and which may comprise and appear as one or more server computers thereon. Interaction server 300 may store information (e.g., content) and application modules which can be provided to the participant devices 200. In some embodiments, these application modules are downloadable to the participant devices 200 and may support various functions that may be required for an interactive meeting or collaborative effort among the participants. The participant devices 200 and the interaction server 300 may interact in a client/server architecture, which may provide high performance and security for a multi-participant collaborative environment.

Network 110 may comprise or be supported by one or more suitable communication networks, such as, for example, a telecommunications network that allows communication via one or more telecommunications lines/channels. In particular, the communication or data networks, such as the Internet, may be used to deliver content, such as for the collaborative computing sessions herein. The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing and audio/hearing. Each website or web page may be supported by documents formatted in any suitable conventional markup language (e.g., HTML or XML). Information may be communicated from a web server to a client using a suitable protocol, such as, for example, Hypertext Transfer Protocol (HTTP) or File Transfer Protocol (FTP).

Figure 2:
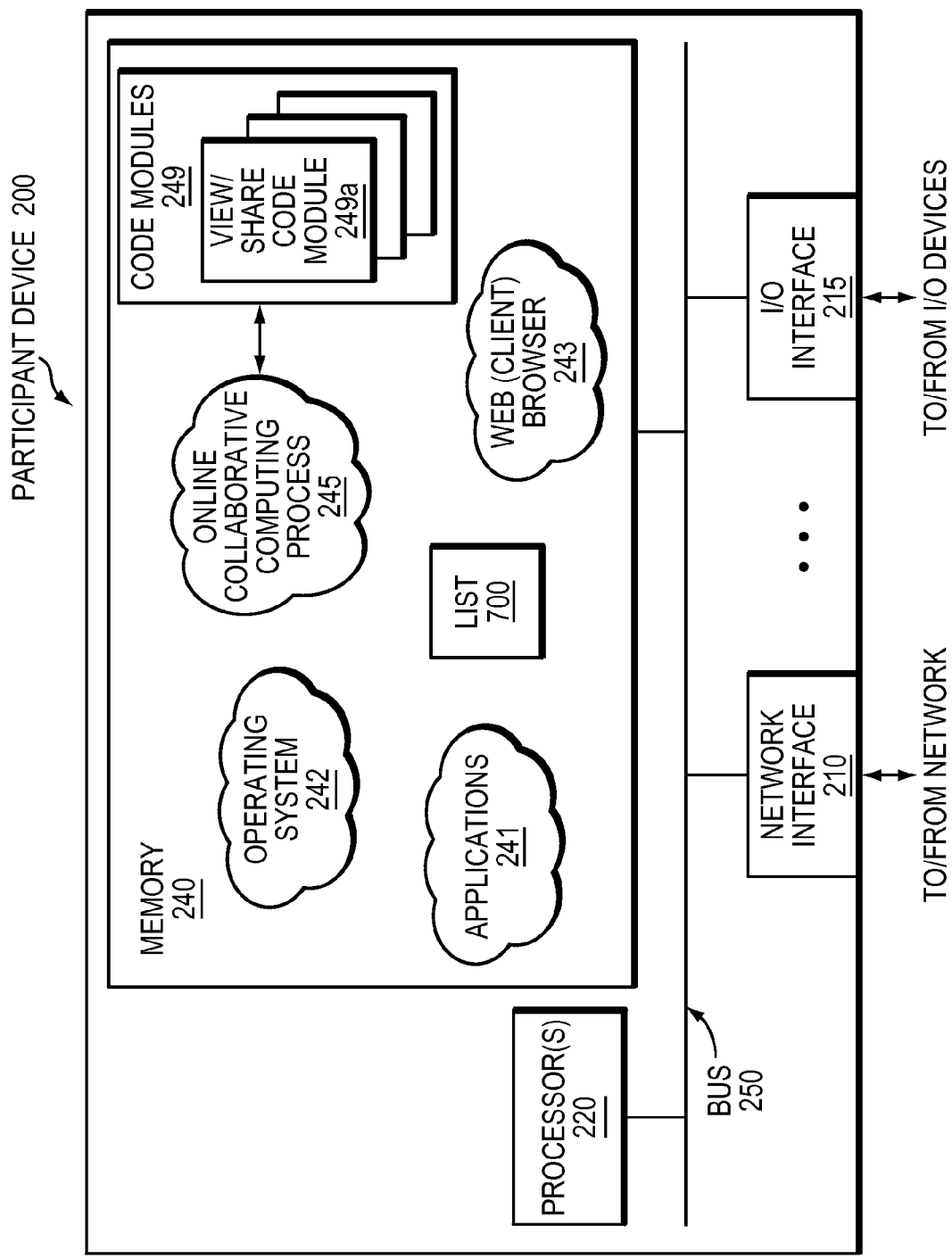
FIG. 2 illustrates an example participant device.

FIG. 2 illustrates a schematic block diagram of an example participant device 200 that may be advantageously used with one or more embodiments described herein, e.g., for collaborative computing. Illustratively, device 200 may be implemented or incorporated in any suitable computer such as, for example, a personal computer (PC), laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable OS.

In particular, the device 200 comprises one or more network interfaces 210, one or more input/output (I/O) interfaces 215, one or more processors 220, and a memory 240 interconnected by a system bus 250. The network interfaces 210 contain the mechanical, electrical, and signaling circuitry for communicating data over physical/wireless links coupled to the network 110. The network interface(s) may be configured to transmit and/or receive data using a variety of different communication protocols suitable for the network. Also, I/O interfaces 215 contain the mechanical, electrical, and signaling circuitry for communicating with one or more user interface devices, such as a mouse, keyboard, monitor/screen, etc. (not explicitly shown).

The memory 240 comprises a plurality of storage locations that are addressable by the processor(s) 220 and the network interfaces 210 for storing software programs associated with the embodiments described herein. A portion of the memory may (though need not) be arranged as a cache (not shown) configured to store one or more data structures and/or code modules 249 associated with the embodiments described herein, e.g., list 700 described below. The processor(s) 220 may comprise necessary elements or logic adapted to execute the software programs and manipulate the data structures. An operating system 242, portions of which are typically resident in memory 240 and executed by the processor(s), functionally organizes the device by, inter alia, invoking operations in support of software processes and/or services executing on the device (e.g., for collaborative computing sessions as used herein). In particular, these software processes and/or services may comprise one or more applications 241, and, in particular, a collaboration process 245 (e.g., for a presenter and/or an attendee/viewer device), which may comprise an activity manager, a communications component, a download engine, and an activity session (not shown). It will be apparent to those skilled in the art that other types of processors and memory, including various computer-readable media, may be used to store and execute program instructions pertaining to the inventive technique described herein, such as a web browser 243, known in the art. Also, the activity manager, communications component, download engine, activity session, and/or code modules 249 may be operated as instances of suitable programs running on the hardware of a participant device 200, as will be further appreciated by those skilled in the art.

The collaboration process 245 may contain computer executable instructions executed by a processor 220 to generally perform functions relating to online collaborative computing sessions, as described herein. For instance, the activity manager portion of the process 245 may manage or control various processes or aspects during the course of an activity (e.g., online meeting or collaborative computing session) in which the participant (user) may interact with other users. For example, this activity may be run in an activity session. In the context of online meetings, for example, the activity manager may manage meeting-related actions (e.g., starting a session, ending a session, locking a session, etc.), manage participant-related actions (e.g., designating a participant as a session host, assigning a participant the presenter privileges, expelling a participant, establishing participant privileges, etc.), manage session-related actions (e.g., starting a sharing session, closing a sharing session, setting privileges within that sharing session, etc.), and support an interface with the user or participant, and provide a container for embedding one or more application code modules.

A communications component of collaboration process 245 may support communication between system 200 and an outside network 110 (e.g., the Internet), such as through network interfaces 210. The communications component thus allows data and information to be exchanged with or retrieved from other systems or facilities (e.g., participant devices 200 or interaction server 300), for example, during an online meeting or other collaborative computing session. In particular, the communications component may provide a communication platform for any one or more of the activity manager, the activity session, the download engine, and the application code modules. The activity manager may rely on the communications component to establish and maintain the client connection to the interaction server 300 on which the activity session is hosted. Each application code module 249 may also use the established client connection to provide real-time data that is sent and received by each participant.

Various functionality for supporting a collaborative computing session, such as an online meeting, may be provided by the one or more application code modules 249. These application code modules 249 may be stored/maintained (e.g., by a cache), and may support, for example, basic communication framework, file sharing (e.g., for text, images, video, audio), user authentication, meeting scheduling, address book, files and folders, invoices, billing, scheduling, telephone or video conferencing, authentication, database management, word processing, application sharing, accounting, etc. For example, code modules may comprise (not specifically shown) a text-based chat module, a polling module, a video module, a voice over Internet Protocol (VOIP) module, a question-answer (QA) module, a file transfer module, a presentation module, an application/desktop view/share module, and an Internet telephony module. Also, one or more of the application code modules 249 may be dynamic linked library (DLL or ".dll") executable object code files.

Illustratively, in accordance with one or more embodiments described herein, the application/desktop viewing/sharing module (shown as 249*a*) may provide functionality for the collaboration process 245 that allows participants to share single applications, multiple applications, or the entire desktop (as understood by those skilled in the art), or, as described in more detail below, individual windows. Generally, for the participant who is a presenter, the application viewing/sharing module may maintain a list of currently running processes that are located at the user level of the local machine. The application viewing/sharing module 249*a* may allow selection of one or more participants with which to share the content of those running processes. In one embodiment, e.g., through a complex kernel driver or screen capturing technology, the application viewing/sharing module 249*a* captures Graphics Device Interface (GDI) calls made from the applications to the system, convert and encode the data, and unicast the data to the other participants via the interaction server 300. For each participant that receives the data, the application viewing/sharing module 249*a* may decode the data and display the content. The viewing/sharing module may allow or enable participants to join or exit a session of application sharing, share or not share an application, set sharing privileges, enter or leave annotations, provide a full screen view of shared information, and get information to be shared. (Further details of application viewing/sharing module 249*a* may be found below with reference to the techniques of one or more embodiments described herein. For example, see FIG. 4 below.)

In addition, the video and/or VOIP modules (not explicitly shown) may provide real-time video and/or voice/audio functionality to each participant to provide different functionality to each participant depending on the status and privileges of that participant. For example, for a participant who is a presenter, the modules may capture the video image from a video input device and/or audio from an audio input device, encode the data, and unicast the data to the other participants through the interaction server 300. For each participant that receives the data, the respective modules may decode the data and display/play the content. Thus, the video module may allow or enable various participants to join or exit a video session, edit video segments, or change a video presenter, while the VOIP module may allow or enable various participants to join or exit a VOIP session, pass the microphone to another participant, or display a volume window or control.

Also, the text-based chat module may provide a real-time text messaging function to each participant, allowing or enabling participants to join or exit an online chat, save or print a portion of the chat messaging, load a chat file, or change the privileges of participants involved in the chat. Also, the polling module and/or QA module may provide real-time polling (or question and answer) functionality to each participant.

Further, the file transfer module may provide functionality for transferring files between and among participants in the session. The functions of the file transfer module vary depending on the status and privileges of each participant. For example, the file transfer module may allow a host/presenter to open any directory accessible from the participant device 200 (local machine) and to post a file pointer in a transfer container. Additionally, a presenter can set file transfer privileges for each participant. Any other participant who has been given privileges to download the file can select the file pointer from the list and save the file to his/her local machine. The file transfer module may allow or enable participants to join or exit a transfer, set permissions for the transfer, transfer the file, and save a file.

Moreover, the presentation module may provide functionality that allows participants to share various printable media types (e.g., document, whiteboard, or facsimile). For the participant who is a presenter, the presentation module can convert the selected media content, encode the data, and unicast the data to the other participants via the interaction server 300 (e.g., in a proprietary format). For the each participant that receives the data, the presentation module may decode the data and display the content. The presentation module may allow or enable participants to open, join, or exit a session of a presentation, save, print, or copy a portion of the presentation, change a presenter, get information about the presentation, add or clear annotations from the presentation, choose a font for the text of presentation, and send the presentation to others via facsimile transmission.

Still further, the telephony module may provide a simple user interface for participating in an interactive, online telephony session. The telephony module may allow or enable participants to join or exit a telephony session, place or disconnect from a telephony call, invite someone else to join in a telephony call, mute or un-mute a telephony call, and get information for a telephone number.

Those skilled in the art may appreciate that the code modules and their respective functionalities are merely examples, and a participant device 200 may comprise additional or fewer code modules 249 than those described above. As such, code modules may be added or removed per-functionality in order to support a collaborative computing session, whether those functions are needed or optional, and the specific code modules described herein are not meant to limit the scope of the embodiments described herein.

Notably, a download engine component of collaboration process 245 may be in communication with the activity session component and communications component (e.g., and a cache) to cause various application modules 249 to be downloaded (e.g., automatically) to system 200 under certain circumstances, such as during an initialization process or when the functionality that is supported by such modules is required. Illustratively, the download engine component may be implemented as ActiveX code (ActiveX download engine), Java code (Java download engine), or any other suitable code which may be appropriate for various browser software. (That is, depending on the browser software that the participant is using to access the meeting and depending on browser and system permissions, the appropriate code-version of the download engine component may be invoked.)

Figure 3:
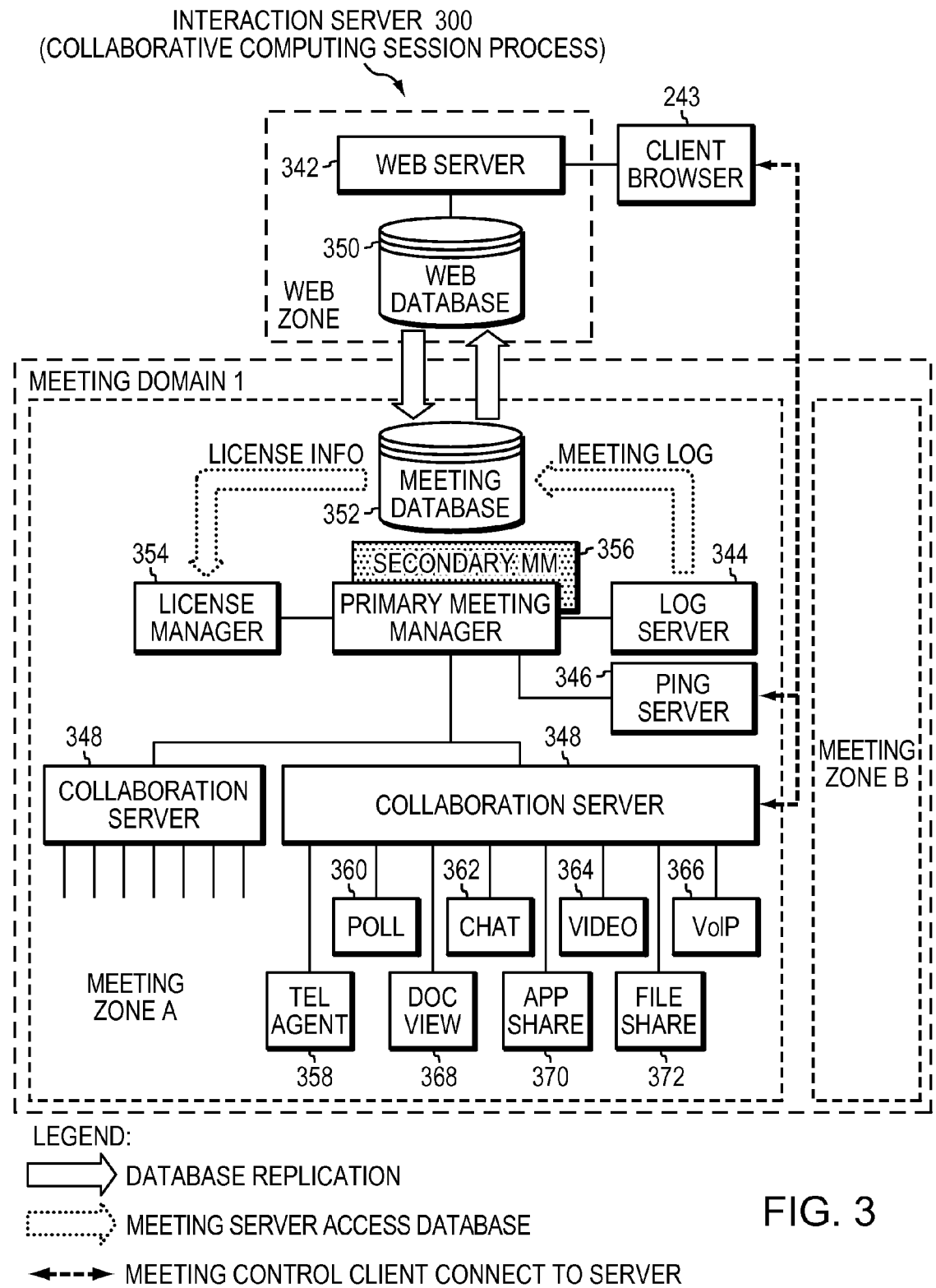
FIG. 3 illustrates an example interaction server.

FIG. 3 illustrates an example implementation for a computer system that may operate as interaction server 300 according to one or more embodiments described herein. Illustratively, in the computer system environment as shown, a number of server computers and databases may be in communication to provide for collaborative meeting or computing. As such, the interaction server 300 and its various components may be referred to as a collaborative computing process 300. Notably, while the illustrative embodiment described below shows a collection of servers (e.g., localized and/or distributed), a single server may also operate to perform the functions described herein (e.g., collaborative computing process 300). Thus, "interaction server 300" may comprise, either as a single server or as a collection of servers, one or more memories, one or more processors, one or more network interfaces (e.g., adapted to communicate traffic for a collaborative computing session and also traffic on a communication channel other than the collaborative computing session), etc., as may be appreciated by those skilled in the art.

In particular, referring to the environment shown in FIG. 3, a number of processing facilities, including, for example, one or more of a web server 342, a log server 344, a ping server 346, a collaboration server 348, license manager 354, primary and secondary meeting managers 356, application servers (e.g. telephone agent 358, poll 360, chat 362, video 364, voice over IP 366, document view 368, application share 370, and file share 372) may be integrated with a number of data storage facilities, such as, for example, a web database 350 and a meeting database 352 to implement a system for collaborative meetings over the Internet (e.g., for collaborative computing session "process" 300). As depicted, the processing and database facilities of this environment ("process" 300) may be divided into a web zone and one or more meeting zones for interaction with one or more client browsers (which may operate on respective participant devices 200).

A web zone may comprise one or more server machines that share a common web database 350. In the web zone, web server 342 may have a unique IP address (which may be associated with a particular website) and may respond to, e.g., Hyper-Text Transport Protocol (HTTP) requests coming to that IP address from client browser 243. Web server 342 serves or supports web pages, while web database 350 may contain static information for the website including site specific data, web pages, and user data.

Illustratively, a meeting zone is a collection of servers and databases that help perform synchronous activity of an online collaborative meeting. In a meeting zone, the meeting managers 356 may be servers which communicate with other servers in the meeting zone (e.g., collaboration server 348, log server 344, ping server 346, etc.) to keep track of the online meetings in progress in the meeting zone. Meeting managers 356 may log meeting information into meeting database 352. Ping server 346 works with meeting managers 356 to determine a collaboration server 348 that is most suitable for hosting a particular meeting; it may act as a load balancer for the meeting service. Collaboration servers 348 may handle all real time control and communication during an online collaborative meeting. The application servers (e.g., servers 358 through 372) may support specific features that may be available as part of an online collaborative meeting, such as, for example, telephony, polling, chatting, video, voice over IP, document review, application sharing, and file sharing. Also, license manager 354 may keep track of and enforce licensing conditions and charges for the meeting. Further, the log server 344 may keep track of meeting logs, and meeting database 352 may maintain at least a portion of the transient data required to conduct and keep track of online meetings. This data may include, for example, site and user information that would be required to establish and conduct a meeting.

Application Sharing between Presenter and Attendees/Viewers

Conventional application sharing techniques capture a predefined portion of the presenter's computer screen (e.g., the entire screen or a rectangle within the entire screen) and provide the image within the predefined portion of the presenter's computer screen to the viewer (e.g., "desktop sharing"). All of the applications that have windows positioned within the predefined portion of the presenter's computer screen are captured by the presenter's computer, transmitted to the viewer's computer, and displayed on the viewer's computer screen whether or not the presenter intended to share these application windows with the viewer. As a result, the presenter may inadvertently share an application window with a viewer that the presenter does not intend to share with the viewer. By using "application sharing," however, these disadvantages may be overcome by sharing or not sharing all of the windows of particular applications as selected by the presenter. For instance, a shared application window generally refers to a window belonging to a shared application, and the term non-shared application window generally refers to a window belonging to a non-shared application. (Note that references to a window are directed to an area utilized to display the content, and references to a desktop are directed to an entire portion of a display area of a corresponding device.)

Figure 4:
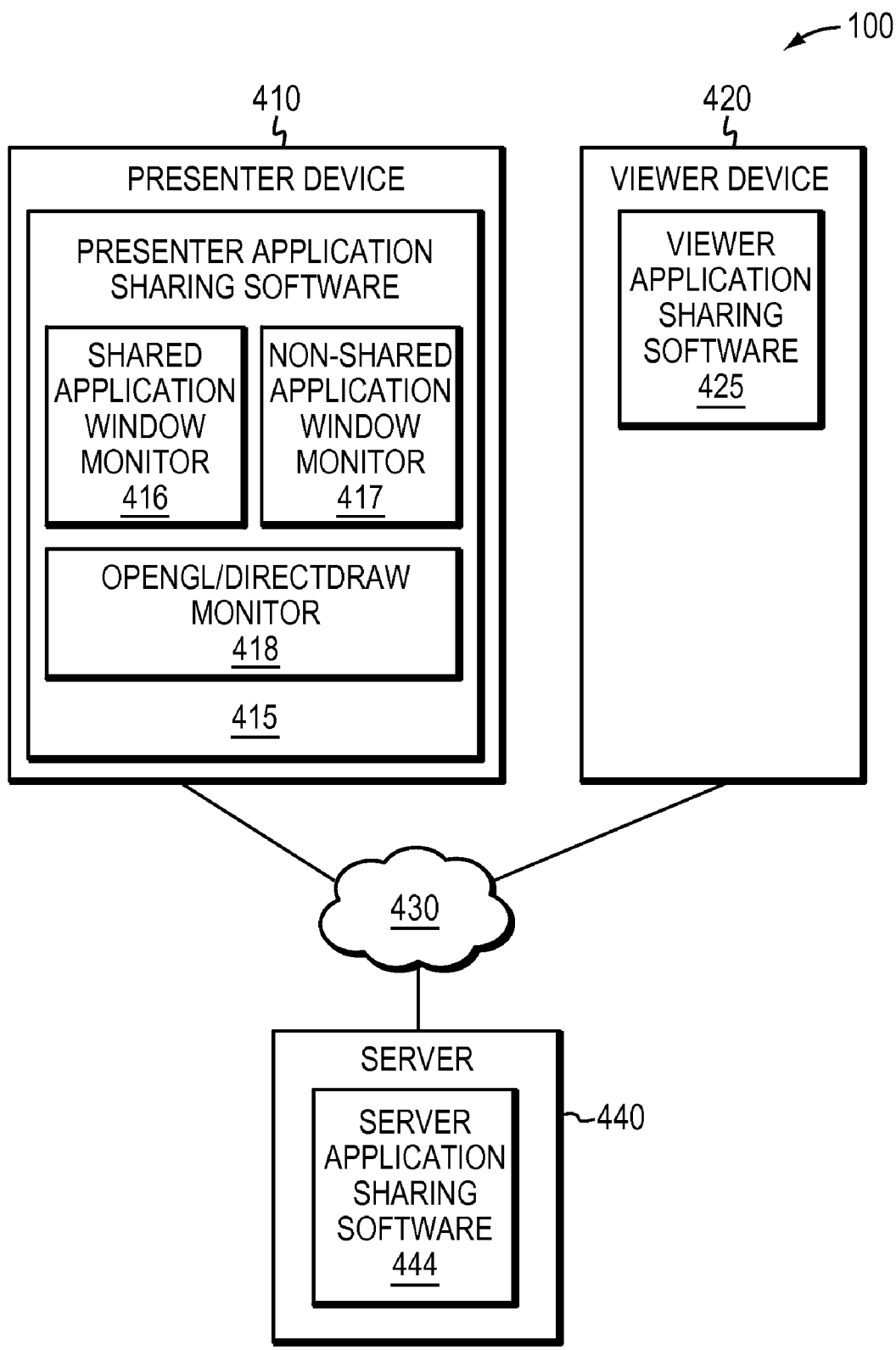
FIG. 4 illustrates an example computer network for display sharing.

FIG. 4 illustrates an alternative view of network 100 (as shown in FIGS. 1-3) in accordance with application sharing, generally. For instance, code module 249a, application/desktop viewing/sharing, may be (for application viewing/sharing only) represented as further detailed in FIG. 4. That is, code module 249a of a presenter device 410 may comprise presenter application sharing software 415, which may be any type of suitable software that enables presenters and viewers to share applications, documents, or the like. Presenter application sharing software 415 may comprise the following software components: shared application window monitor 416, non-shared application window monitor 417, and OpenGL/DirectDraw monitor 418. The function of each of these software components is discussed in detail below. Presenter application sharing software 415 may also include other software components that are not shown or discussed for clarity.

Viewer device 420 also includes viewer application sharing software 425 (as a detailed embodiment of code module 249a), which can be similar to or the same as presenter application sharing software 415. Viewer application sharing software 425, among other things, receives images of application windows from the presenter's computer and displays the images on the viewer's computer screen.

According to application sharing, a presenter may select which particular applications to share with the one or more attendees/viewers of a collaboration session. The presenter's device (e.g., presenter application sharing software 415) may then transmit shared applications to the viewer's device (e.g., to viewer application sharing software 425) over network 430, with non-shared applications not transmitted, and overlapping regions (where the non-shared applications cover the shared applications) being blocked from transmission. (Notably, while the techniques described herein reference presenter application sharing software 415 as operating to control the sharing/non-sharing of application windows, the server application sharing software 444 of server 440/300 may instead be configured to receive all viewable content from the presenter, and to limit the transmission of non-shared or covered shared application windows, accordingly.)

Figure 5A:
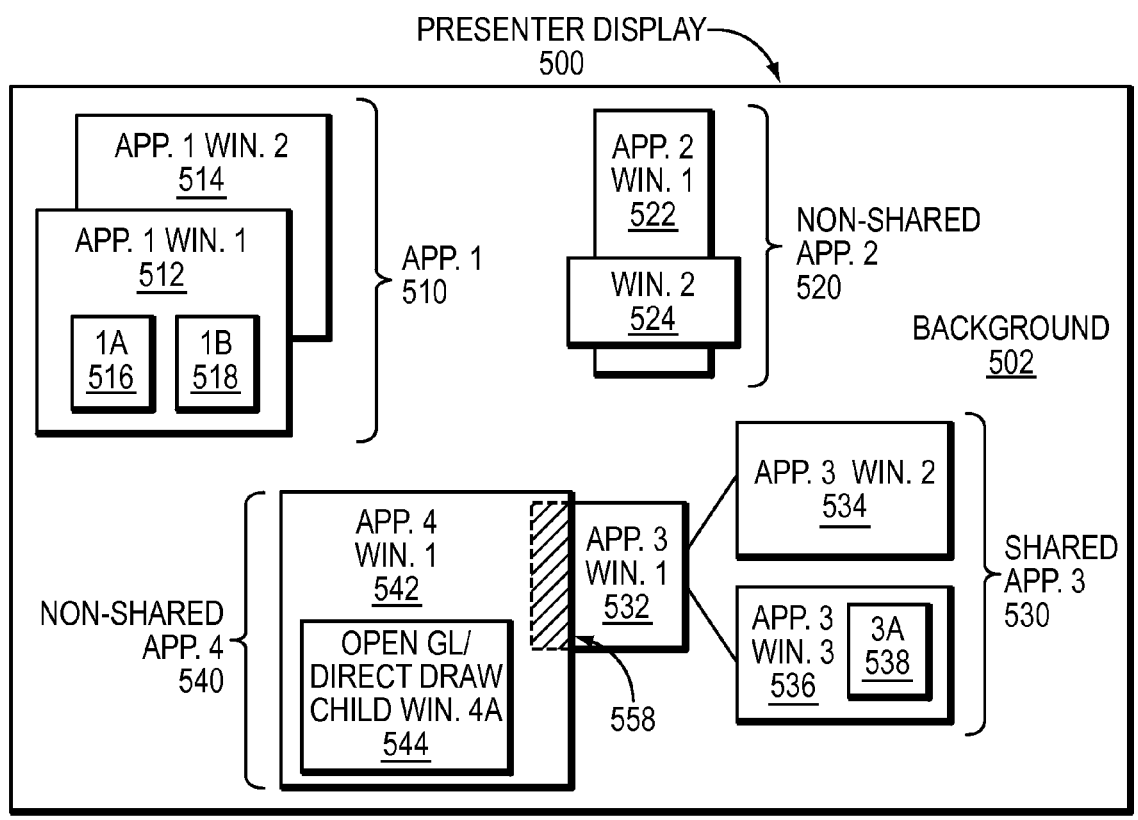
FIG. 5A illustrates an example presenter device display.
Figure 5B:
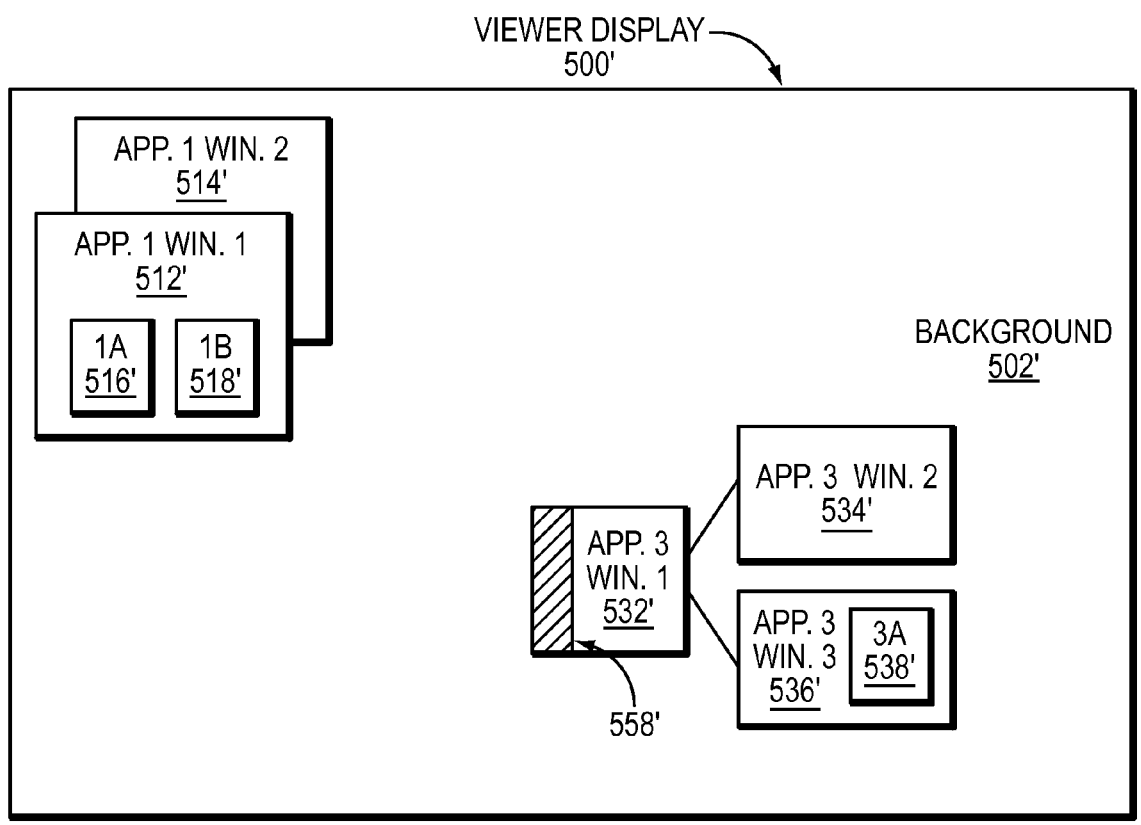
FIG. 5B illustrates an example attendee/viewer device display.

Illustratively, FIGS. 5A and 5B show an example of how application sharing (e.g., application-based screen sampling) may operate during a data conference. FIG. 5A shows a presenter's computer screen 500 having background region 502, shared applications "1" and "3" (510 and 530, respectively), and non-shared applications "2" and "4" (520 and 540, respectively). As shown, shared application 1 has shared application windows 512 (with child windows 1A 516 and 1B 518) and 514, and shared application 3 has shared application windows 532, 534, and 536 (with child window 3A 538). Non-shared applications 2 and 4 have non-shared application windows 522, 524, and 542 (and child window 4A 544, e.g., an OpenGL/DirectDraw region, which is a region drawn by OpenGL/DirectDraw, respectively, such that the remaining region of window 542 is referred to as a non-OpenGL/DirectDraw region). Note that application window 542 overlaps application window 532 in overlapping region 558.

Based on application sharing, therefore, FIG. 5B shows a viewer's computer screen 500', which has background region 502', shared application windows 512' (and 516' and 518'), 514', 532', 534', and 536' (and 538'), and overlapping regions 558'. In particular, a portion of application window 532' is obscured by overlapping region 558', and is thus blocked from view by the attendee/viewer on screen 500'.

For example, to create FIGS. 5A and 5B, once a data conference has started, the presenter may select one or more applications to share with a viewer. Presenter application sharing software 415 receives the presenter's selections and then performs application based sharing as follows with reference to FIG. 5.

Figure 6:
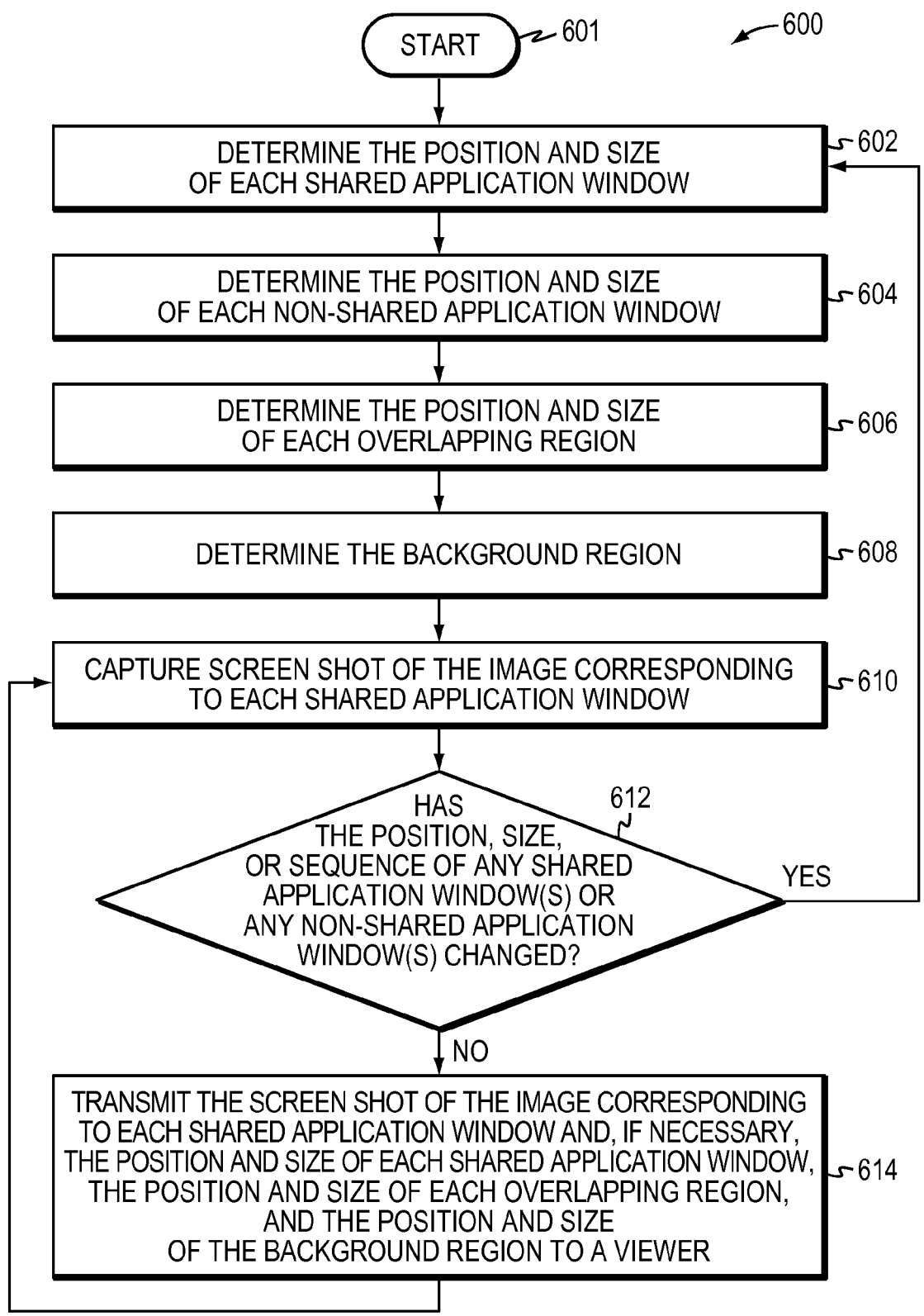
FIG. 6 illustrates an example procedure for application sharing, generally.

In particular, FIG. 6 is a flowchart of an example procedure 600 for application-based screen sampling, according to one or more embodiments herein. (Procedure 600 assumes that the presenter has pre-defined or pre-designated an application as a shared application during the data conference, as mentioned above.) Procedure 600 begins in step 601, and continues to step 602, where the position and the size of each shared application window is determined, e.g., by shared application window monitor 416. If the shared application only has one window, the position and size of this window is determined. If the shared application has several windows, the position and size of each of these windows is determined.

The position and size of each shared application window may be determined dynamically by monitoring and intercepting function calls made by the shared application to a graphics display subsystem. For instance, the graphics display subsystem receives the function calls and, in response, causes appropriate graphics or images to be drawn on the presenter's computer screen 500. For example, if the application is running on a Microsoft Windows based computer, the application may call Graphics Device Interface (GDI) functions to draw images on the presenter's computer screen. The function calls provide information that identifies which application a particular window belongs to, the position of the window, and the size of the window. Thus, by monitoring and intercepting the function calls, the position and size of a window can be determined.

Notably, in step 602, the position and the size of each OpenGL and/or DirectDraw regions of a shared application window may also be determined (e.g., by OpenGL/DirectDraw monitor 418). For instance, the OpenGL/DirectDraw regions are the areas within the shared application windows that are drawn by OpenGL/DirectDraw (respectively).

OpenGL is a well-known application program interface (API) that is used by applications to draw graphics (e.g., 2D and 3D graphics) on a presenter's computer screen. To generate graphics using OpenGL, an application first launches OpenGL. The application then calls OpenGL functions. As a result of these function calls, OpenGL internally calls glFlash, glDraw, and/or glEscape, which are OpenGL subsystems. Finally, the glFlash, glDraw, or glEscape subsystems cause the graphics to be drawn on the presenter's computer screen.

The position and size of the OpenGL regions of each shared application window can be determined dynamically by monitoring and intercepting OpenGL function calls made by the application. For example, the position and size of the OpenGL regions of each window belonging to a shared application can be determined dynamically by monitoring and intercepting function calls to the glFlash, glDraw, and glEscape subsystems of OpenGL. Thus, by monitoring and intercepting the function calls made to OpenGL or to the glFlash, glDraw, and/or glEscape subsystems of OpenGL, the position and size of each OpenGL region within a shared application window can be determined.

In addition, DirectDraw is a well-known Windows-based API used to create graphics. Many applications use DirectDraw to draw graphics on a presenter's computer screen. Unlike OpenGL and other general windows APIs, DirectDraw is COM based. To generate graphics using DirectDraw, an application first launches DirectDraw. The application then gets the COM interfaces corresponding to DirectDraw. Next, the application calls the DirectDraw COM interface to access the DirectDraw functions. Finally, the DirectDraw COM interface calls an internal function to render the graphics.

The position and size of each DirectDraw region of each shared application window can be determined by monitoring the DirectDraw COM interface. As mentioned above, DirectDraw is not like OpenGL and other general windows APIs; DirectDraw is COM based. Since Direct Draw is COM based, it is not possible to monitor function alls made by the application directly to DirectDraw to determine the position and size of each DirectDraw region of each shared application window. However, Applicant has discovered that the position and size of each DirectDraw region of each shared application window can be determined by dynamically monitoring the DirectDraw COM interface and intercepting information that defines the position and size of each DirectDraw region of each shared application window. It should also be recognized that the procedure may be modified so that any COM interface, not just the DirectDraw COM interface, can be monitored.

In step 604, the position and the size of each non-shared application window is determined, e.g., by non-shared application window monitor 417. If the non-shared application only has one window, the position and size of this window is determined. If the non-shared application has several windows, the position and size of each of these windows is determined. The position and size of each non-shared application window may be determined dynamically by monitoring and intercepting function calls made by the non-shared application to a graphics display subsystem (as described in step 602 above).

In step 606, the position and size of each overlapping region is determined. An overlapping region is a region on the presenter's computer screen where a non-shared application window overlaps a shared application window, such as, e.g., a non-OpenGL region or an OpenGL region of a shared application window or a non-DirectDraw region or a DirectDraw region of a shared application window (generally, "shared application windows" herein). If none of the non-shared application windows overlap shared application windows, there are no overlapping regions. Conversely, if multiple non-shared application windows overlap shared application windows, there are multiple overlapping regions. The position and size of each overlapping region can be determined by comparing the position and size of each shared application window with the position and size of each non-shared application window.

In step 608, the background region is determined, which is the area on the presenter's computer screen that is not occupied by a shared application window. The background region includes areas of the presenter's computer screen that are occupied by non-shared application windows, or not occupied by any application windows. The background region can be determined by comparing the position and size of each shared application window (e.g., non-OpenGL and the OpenGL regions or non-DirectDraw and the DirectDraw regions of each shared application window) with the position and size of the presenter's entire computer screen.

In step 610, a screen shot of the image corresponding to (or "within") each shared application window is captured so that it can be provided to the viewer. This step may be performed periodically (e.g., five times per second) so that changes to the image on the presenter's computer screen are quickly reflected on the viewer's computer screen. Illustratively, the screen shot of the image corresponding to each shared application window can be captured by capturing portions of the frame buffer on the presenter's computer that correspond to shared application windows. Since step 602 determines the sizes and positions of the shared application windows, the location of the shared application windows within the frame buffer are known.

In step 612, the position, size, and sequence of each shared application window and each non-shared application window is monitored. If the position, size, or sequence of a shared application window or a non-shared application window changes, then procedure 600 returns to step 602. If the position, size, and sequence of the shared application windows and the non-shared application windows do not change, then procedure 600 proceeds to step 614. The position, size, and sequence of each shared application window and each non-shared application window on the presenter's computer screen can be dynamically monitored by monitoring and intercepting function calls made by the shared and non-shared applications to a graphics display subsystem (as described in step 602 above).

In step 614, the screen shot of the image corresponding to each shared application window and, if necessary, the position and size of each shared application window, the position and size of each overlapping region, and the position and size of the background region is transmitted to the viewer's computer, e.g., via server 440 ("server application sharing software" 444). If the position, size, and sequence of the shared application windows and the non-shared application windows have not changed since the previous screen shot was transmitted to the viewer's computer, then the position and size of the shared application windows, the position and size of the overlapping regions, and the position and size of the background region do not have to be retransmitted to the viewer's computer. On the other hand, if the position, size, or sequence of the shared application windows or the non-shared application windows have changed since the previous screen shot was transmitted to the viewer's computer, then the updated position and size of the shared application windows, the updated position and size of the overlapping regions, and/or the updated position and size of the background region are transmitted to the viewer's computer. This ensures that the viewer's computer screen accurately reflects what is currently displayed on the presenter's computer screen. Prior to transmission, the screen shot of the images corresponding to each shared application window can be compressed using known image compression techniques such as GZIP or JPEG.

Once the viewer's computer has received the screen shot of the image corresponding to each shared application window, and if transmitted, the position and size of each shared application window, the position and size of each overlapping region, and the position and size of the background region, viewer application sharing software 425 can display the image on the viewer's computer screen 500'. To accomplish this, viewer application software 425 performs the following process. First, viewer application software 425 generates or draws a background region based on the position and size of the background region. The background region can be filled or painted with an arbitrary color or image. Second, viewer application software 425 generates or draws a window corresponding to the position and size of each shared application window. Third, viewer application sharing software 425 generates or draws the image corresponding to each shared application window inside of each shared application window. Fourth, viewer application software 425 generates or draws an overlapping region corresponding to the position and size of each overlapping region. The overlapping region can be filled or painted with an arbitrary color or image. Those skilled in the art will understand the above details are merely representative examples, and that other application sharing techniques may be used, accordingly.)

Efficient and Individual Sharing of Application Windows

According to one or more embodiments described herein, a presenter device participating in an online collaborative computing session may determine a set of displayed application windows, and may generate a list of the displayed windows to provide individual window sharing "selectability" (i.e., the ability to be selected as either shared or not shared). In addition, the embodiments described herein also provide for entire application sharing selectability, which takes priority over the individual window selections. Similar relationships may be formed between parent windows and their individual child windows. In this manner, a presenter may efficiently select individual windows or entire application sets of windows for sharing, where the presenter device shares only those selected windows (or sets) with the attendee devices. In particular, to provide this functionality to online meetings, the visual region of all displayed application windows may be obtained, and any unshared windows' regions are masked from viewing by an attendee/viewer device, thus showing only the shared windows' visual regions.

Specifically, application sharing (application-based screen sampling) allows a presenter to define or designate applications as shared applications and non-shared (or "unshared") applications. Windows belonging to shared applications and non-shared applications are monitored and only windows belonging to shared application windows are displayed on a viewer's computer screen. When selectively sharing applications, all windows associated with the application are shared. That is, one application process may create multiple windows, and all of the created windows are shared or not shared based on the application's sharing status. In certain situations, this may cause cumbersome meeting activity and presenter (and attendee) frustrations, and may also present security problems when accidentally sharing windows of applications with secure/private information contained therein. Conversely, according to the techniques described herein, each individual window of an application may be separately shared, thus affording a presenter with greater, more granular control over shared windows. At the same time, however, this granular control may itself become inefficient and cumbersome, where many individual windows are created for the same application. According to the embodiments herein, therefore, an efficient independent window sharing technique is described that allows for both individual window sharing and grouped window sharing based on parent applications' or parent windows' sharing states (that is, the sharing state of the parent application or parent window that created or generated the windows in question).

Illustratively, certain techniques described herein (e.g., the sharing selectability) may be performed by presenter device 410 or interaction server 440/300, such as in accordance with presenter application sharing software 415 or server application sharing software 444, respectively. In particular, these processes and/or services may be configured to operate in accordance with certain techniques as described herein, such as dependent upon whether the images (viewable shared application windows) for transmission to viewer/attendee devices are rendered by the presenter device or server supporting the online collaborative computing session. Alternatively, and more generally when performed on the presenter device, the techniques may be performed by "presenter collaboration process" 245.

Operationally, the presenter device 410 (200) may participate in an online collaborative computing session as described in detail above. In one embodiment, the presenter may be provided with the option to share applications as a whole (i.e., all windows of the application) or to share individual windows of the applications, or, more particularly, the option to share both entire applications and individual windows. Assuming the presenter selects either of the lasts two options (or assuming that there is no other option for the presenter), the presenter device may determine one or more windows displayed on the presenter device display 500 as described above (e.g., monitoring applications and visual function calls), and may additionally generate a list of the displayed windows. Notably, as may be appreciated by those skilled in the art, a window may be a parent window or a child window (to a parent window). For example, a parent window may comprise a main window for a word processing application, and a child window may comprise a particular toolbar within the word processing application. Other parent/child relationships will be understood by those skilled in the art, such as various buttons (e.g., "OK," "CANCEL") of a message parent window, etc.

FIG. 7A illustrates an example list 700 that may be used in accordance with the techniques described herein, though other formats, forms, styles, etc., may be used (e.g., tables, icons, etc.). The list 700 may comprise one or more entries 750, each having illustrative fields for storing application and window identification information and a corresponding sharing selection. For instance, as shown, illustrative fields comprise an application name 705, an application sharing selection 710, a window identification 715, a corresponding window sharing selection 720, a child window identification 725, and a corresponding child window sharing selection 730. Application name field 705 may be populated with names associated with each executing application (e.g., Application 1-4), while window identification field 715 may be populated based on an identification of each window (e.g., each parent window). Further, where applicable, child window identification 725 identifies any child windows to a parent window, as described below.

One example naming convention that may be used to identify applications and windows may be similar to a known "taskbar" typically located at the lower edge of a user's computer display, where applications are identified by icons or names, and windows by their associated document or filename. Other naming conventions may be used, such as simple numbering schemes, and all such identifications may be used in accordance with the techniques herein. (The names used herein, therefore, are merely for ease of discussion, and are not meant to limit the scope of the described embodiments.)

According to the embodiments herein, the presenter is able to select an application as a whole for sharing, i.e., thus being able to control all windows of particular applications rather than individual windows (e.g., sharing a presentation application having slides to be presented during a meeting, but not sharing an email application executing on the presenter's device.) For instance, the application sharing selection field 710 may be populated with values indicating shared (e.g., "yes"), unshared (e.g., "no"), or neither shared nor unshared (e.g., "-"). The entire application sharing selectability takes priority over individual window sharing selections, such that all windows (parent and child) of a shared application are shared windows and all windows of an unshared application are unshared windows, regardless of the individual window sharing selections (fields 720/730) of the corresponding windows for the respective parent applications. For example, Applications 1 and 4 are shown as neither shared nor unshared. However, Application 2 is shown having sharing selection 710 populated with a "no", thus any windows associated with Application 2 are prevented from being shared ("all unshared"), and Application 3 is shown having sharing selection 710 populated with a "yes", thus any windows associated with Application 3 are shared ("all shared" or "shared"). Note that the window-related options of Application 2 and 3 are illustratively grayed out, indicating to the presenter the inability to change the sharing selection of individual windows of the corresponding parent application without changing selection field 710. In other words, individual window sharing selectability may be rendered inoperative in response to a shared or unshared selection of a corresponding parent application.

For those applications that do not have a particular sharing selection established, the embodiments herein may further provide individual window sharing selectability for the presenter device through the list (i.e., prompting a presenter to select whether each individual window is to be shared or unshared, such as particular Internet browser windows versus other Internet browser windows). For instance, for Application 1, the presenter has illustratively selected window 1 as shared and window 2 as not shared. Also, in accordance with some embodiments, the presenter has illustratively selected child windows 1A and 1B of parent window 1 as shared and not shared, respectively. Accordingly, child window sharing need not be solely dictated by the parent window's selection, since the parent window may be shared or unshared itself, which is different from entire application sharing selections (i.e., there is no context of an application to share other than the windows of the application, thus sharing a window individually versus sharing all windows associated with a particular parent window are separately selectable options).

Further, for Application 4, window 1 has been individually selected as "all no" or "all unshared." As such, child window 4A may be forced to an unshared selection (and grayed out), since the presenter has selected that no window associated with window 1 of Application 4 is to be shared (this does not prevent a new window of Application 4 from being shared, since there is no sharing selection associated with the entire Application 4, thus still being different than entire application sharing described above.)

Notably, while the selections above with reference to FIG. 7A are shown as "yes", 6"no", "all yes" (entirely shared), "all no" (entirely unshared), and "-", the actual selections may be provided within the list for each individual displayed window or application as a checkbox, an option selection, a drop-down menu, and a clickable option, and those shown herein are merely examples. Thus, regardless of the selection mechanisms, the presenter device may be able to accordingly determine a set of shared windows of the presenter device that are to be shared with the attendee devices and a set of unshared windows of the presenter device that are not to be shared with the attendee devices based on individual window sharing selections and entire application sharing selections within the list.

For example, an alternative view of the sharing selection list 700 may be seen in FIG. 7B, which illustrates an example list that may be easier for a presenter to navigate (e.g., in a tabbed outline arrangement, as will be understood), having the same selections of the list shown in FIG. 7A. For instance, all selections are shown in parentheses "(--)" where uppercase words indicate the selection, and any remaining available options (if any) are shown in lower-case words. Those selections manually made by the presenter are shown underlined, such that any "forced" selection (based on a parent application's selection, or a parent window's "all" selection) is not underlined and shown in italics, along with the absence of other selectable options within the parentheses.

Figure 8A:
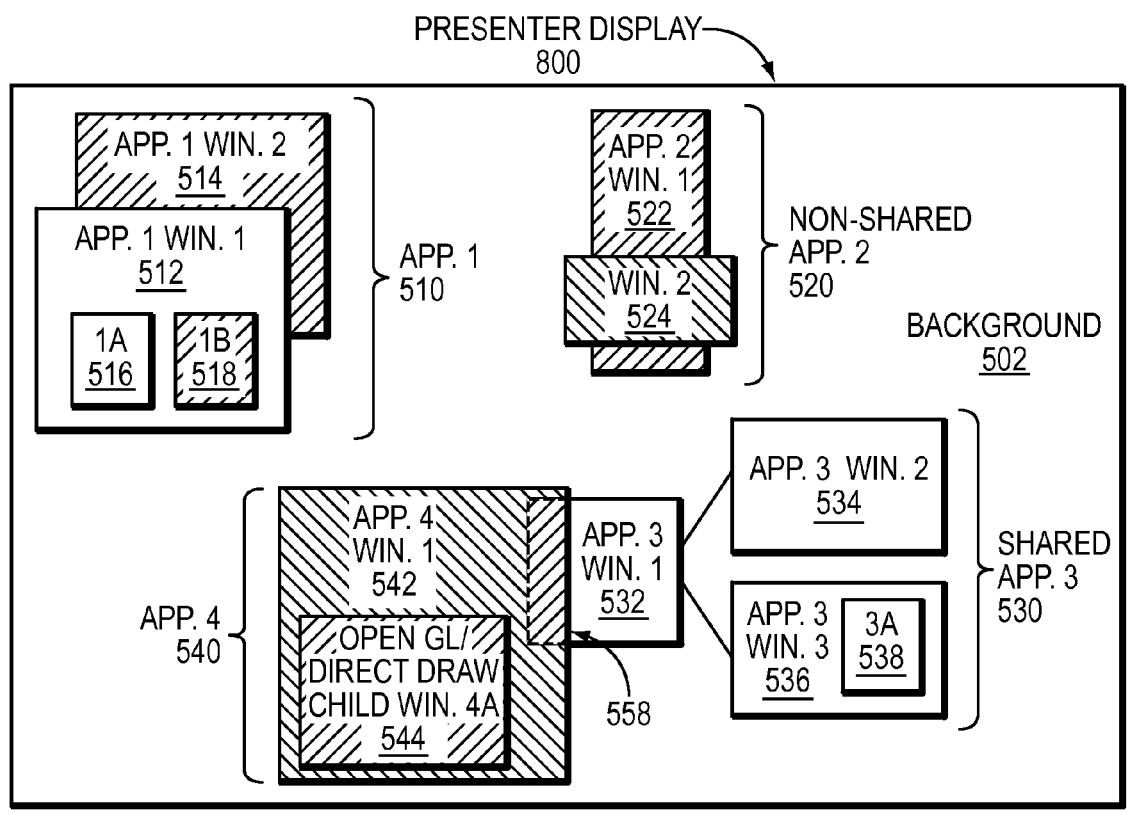
FIG. 8A illustrates an example presenter device display with application and individual window sharing.

FIG. 8A illustrates an example presenter device display 800 showing a graphical representation of list 700 selections described above. For instance, assume that the presenter has selected one or more applications as well as individual windows to be shared or unshared among attendees of the online collaborative computing session, such as in accordance with list 700 of FIGS. 7A/B. As such, window 1 (512) and its child window 1A (516) of Application 1 (510), and all windows 1-3 (532, 534, and 536 with child window 3A 538) of Application 3 (530) are shown as being shared. Conversely, window 2 (514) and child window 1B (518) of Application 1, all windows 1-2 (522 and 524) of Application 2 (520), and window 1 (542) and its child 4A (544) of Application 4 (540) are shown as not shared.

Notably, according to one or more embodiments described herein, each non-shared/unshared window on the display of the presenter device may be "grayed out," such that the presenter viewing the unshared application windows will see a distinctly different colorization of the viewed application. For instance, as may be appreciated by those skilled in the art, graying out describes displaying an application window with a light shade of gray, e.g., overlaid upon the window, or having grayscale colors replace full colors within the window. In this manner, the application window may appear lighter or darker than a conventional window, and in particular, than a viewable shared application window according to the techniques described herein. Thus, the use of the phase "graying out" need not imply the color gray, a grayscale view, or any other action associated with the color gray. Instead, its use implies any technique, known or otherwise, that may be used to change the appearance of a window, e.g., lighter or darker, such that a presenter may be made aware of the fact that these changed appearance windows (e.g., viewable unshared windows) are different from non-changed appearance windows (e.g., viewable shared windows).

Figure 8B:
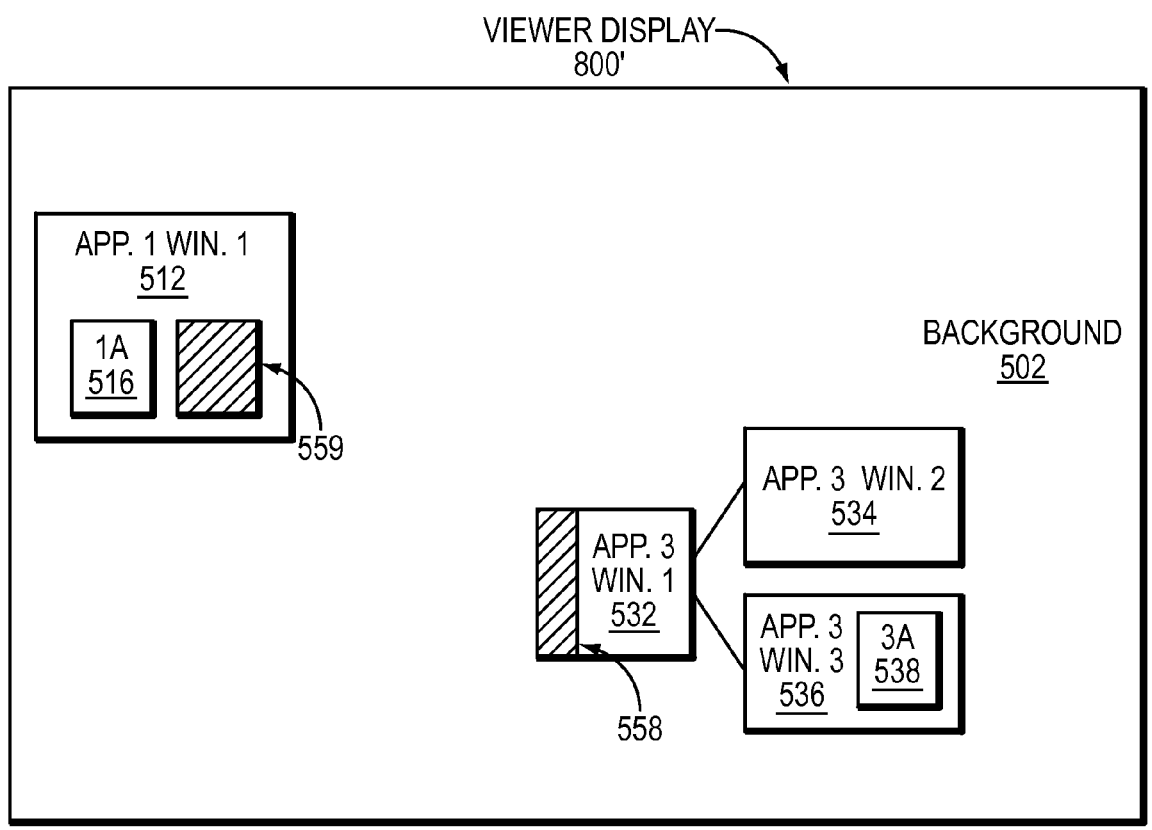
FIG. 8B illustrates an example attendee/viewer device display with application and individual window sharing.

Once the sharing selections have been made by the presenter, the presenter device may determine the sets of shared and unshared windows, and may share the set of shared windows with the attendee devices of the online collaborative computing session, without sharing the set of unshared windows, accordingly. For instance, as described above, by monitoring visual function calls (e.g., GDI calls) for an application to draw a particular displayed window, the presenter device (sharing software 415 or server software 444) may thus determine where the corresponding window is drawn. In particular, as described above with reference to FIGS. 5A-6, the viewable portions of the shared application windows on a display 800 of the presenter device that are to be (or are being) transmitted to attendee devices (800') may be determined. In other words, a shared visual region that corresponds to shared windows may be determined, as well as an unshared visual region of that corresponds to unshared windows. The shared visual region may be transmitted to the attendee devices, while any unshared visual region that overlaps the shared visual region is blocked from being shared. That is, if an unshared window covers a portion of a shared displayed window, that portion may be hidden from the attendee devices, as described above (e.g., overlapping portion 558). FIG. 8B illustrates an attendee device's visual display 800' showing the shared applications and/or individual windows as selected by the presenter above (and corresponding to the non-grayed out windows of presenter's display 800 in FIG. 8A above). A new overlapping region 559 is also shown in window 1 of Application 1, since child window 1B is no longer shared, and is covering a shared portion of its parent window 1 512.

In addition, a new window may be created for display on the presenter device, such as a manually opened application, an application generated window (e.g., a new message, alert, pop-up, etc.), or other new window. In such an event, the presenter device may detect this new window, and may add this new window to list 700 for sharing selection. In the event that a parent application has been selected to share or not share its windows, then the newly created window will fall into that same category of sharing, as described above. For instance, if a presenter is performing a task in an application that generates numerous new windows, it would be inconvenient to have to address each and every window that is opened, whether the windows are all to be shared or not. (Note that this is a particular advantage afforded by the techniques described herein for efficiently providing individual window sharing selectability.) For example, if Application 3 generates a new window (e.g., window 4), then that new window would be shared without presenter intervention. Conversely, if Application 2 generates a new window (e.g., window 3), that new window would be shared in accordance with Application 2's sharing selection.

At the same time, however, if the parent application does not have a particular sharing selection (or if the window is from a newly executed application), then rather than simply adding the new window to the list 700, the presenter device may prompt a presenter (user) to address the sharing of the new displayed window, such as by displaying a message on display 800 or by bringing the updated list 700 to the front (or otherwise to the presenter's attention, e.g., flashing, highlighting, etc.). For example, assume that Application 4 generates a new window. Even though the only window (window 1) of Application 4 is not shared, since Application 4 does not have a specific sharing selection, the new window of Application 4 may be individually shared or not, based on a prompted response from the presenter. Further, in one embodiment, the presenter may be prompted prior to the new window being shared with any attendee devices, as an added security measure (particularly where the parent application is neither shared nor unshared, but also in the event the parent application is shared). Similar logic applies to the child windows of an application, where a new child window may be shared or not based on its parent window's selection, as described above (e.g., a new child window for window 1 of Application 4 would be unshared by default, while a new child window for window 1 or 2 of Application 1 would be subject to a new sharing selection).

Figure 9:
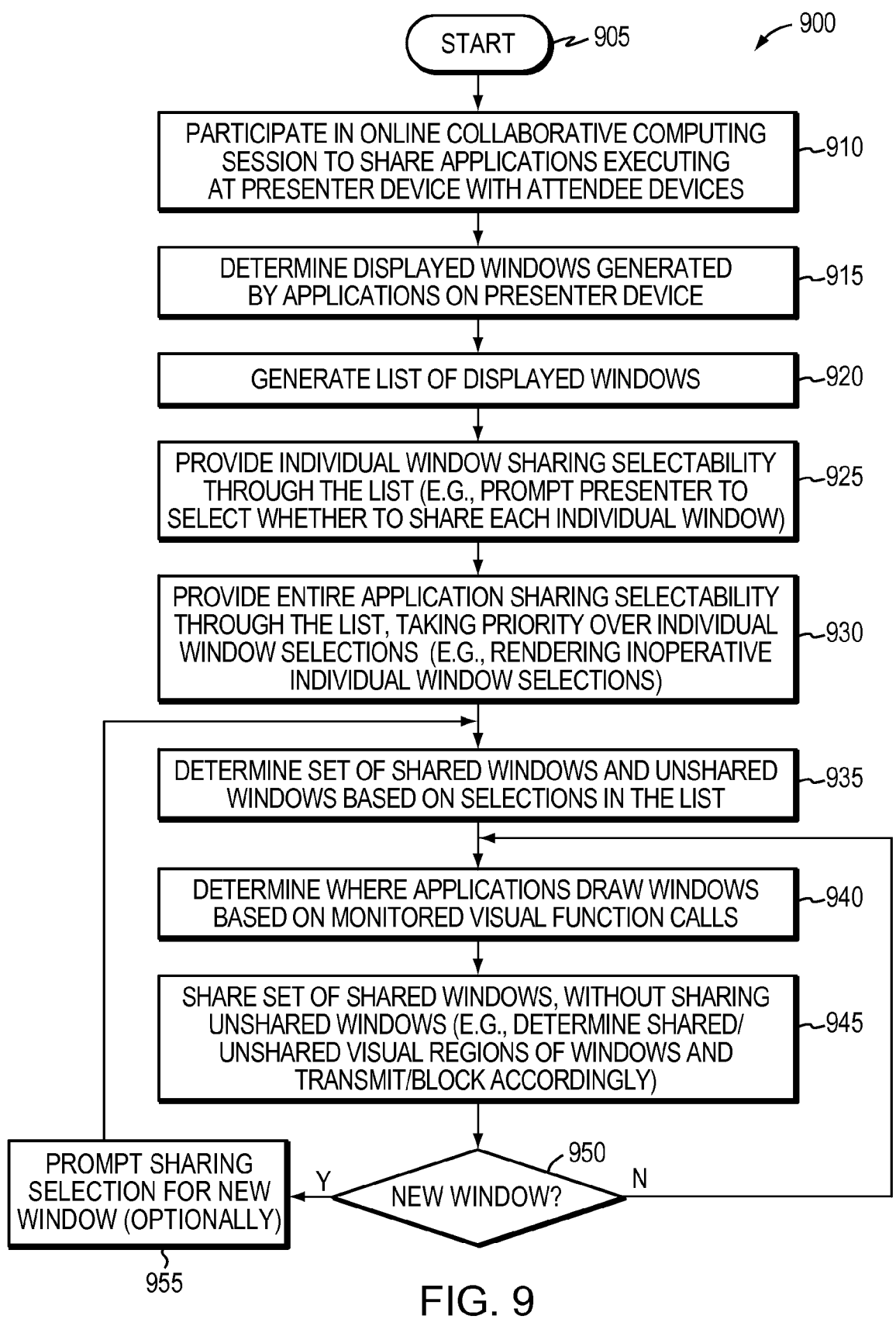
FIG. 9 illustrates an example procedure for providing application and individual window sharing selectability for online collaborative computing sessions.

FIG. 9 illustrates an example procedure for providing individual window sharing selectability for online collaborative computing sessions in accordance with one or more embodiments described herein. The procedure 900 starts at step 905, and continues to step 910, where a presenter device 200 participates in online collaborative computing session to share applications executing at the presenter device with one or more attendee devices 200, as described above. In step 915, the presenter device may determine displayed windows generated by applications on the presenter device, e.g., in a manner as described above. Once the displayed windows are determined, the presenter device may generate a list 700 of the displayed windows in step 920, and in step 925 may provide individual window sharing selectability through the list. For example, as noted above, various selection techniques may be used to prompt a presenter to select whether to share each individual window, accordingly. Further, in step 930, the presenter device may also provide for entire application sharing selectability as described above, such that the entire application sharing selections take priority over the individual window sharing selections (e.g., rendering inoperative the individual window sharing selectability, as mentioned above).

In step 935, the presenter device may determine the sets of shared and unshared windows based on the selections in the list, and may then determine where corresponding applications draw the windows in step 940, such as by monitoring visual function calls, noted above. (Notably, the locations of shared and unshared windows may be determined in this step, particularly to determine overlap.) In step 945, the set of shared windows may be shared with attendee devices without sharing the unshared windows, e.g., based on determining the shared/unshared visual regions of windows and transmitting/blocking the images accordingly.

In the event there is a new drawn window in step 950, the presenter device may prompt for a sharing selection for that new window in step 955 (e.g., where the parent application is not selected as shared or unshared), returning to step 935 to act upon the selection, for instance, prior to sharing (or not sharing) the new window with the attendee devices as noted above. If there is no new window, the procedure 900 continues to step 930 to continually share or not share individual windows based on the selections made in list 700. Notably, the procedure 900 may illustratively continue from any step (e.g., 940) depending upon whichever action is to be performed in any particular order, as may be appreciated by those skilled in the art, and the loops shown herein are merely an illustrative example.

Advantageously, the novel techniques described herein provide efficient control over individual window sharing selectability for online collaborative computing sessions in a computer network. By sharing each window individually, yet under the control of a parent application's (or parent window's) shared state, the novel techniques allow a presenter to control very specifically and easily which windows are to be shared or not, thus allowing the presenter more granular control over the shared or non-shared windows. In particular, the novel techniques allow the presenter to share individual windows of an application regardless of how many windows are created by that application, and conversely, allow a presenter at the same time to share entire applications, regardless of the number of windows it creates. In other words, the embodiments described herein do not merely share entire applications or individual windows, but rather offers a unique system and method to more easily control the sharing of individual windows based on parent application sharing states.

While there have been shown and described illustrative embodiments that provide individual window sharing selectability for online collaborative computing sessions in a computer network, it is to be understood that various other adaptations and modifications may be made within the spirit and scope of the present invention. For example, the embodiments have been shown and described herein for use with web browser-based applications, such as online conference meeting sites. However, the embodiments of the invention in their broader sense are not so limited, and may, in fact, be used with other applications/sessions, as may be appreciated by those skilled in the art. Also, it is important to note that the term windows is used as a generic term, and it does not imply specific conformance to one operating system over another, as may be appreciated by those skilled in the art. Note, too, that while applications are generally shown having separate and distinct windows, it may be possible to apply the techniques above to "nested" windows within a parent application window (also referred to in the art as multiple document instances or "MDIs" in contrast to single document instances or "SDIs"). As such, each nested window may also be selectively shared within the capabilities of the sharing software to distinguish the nested windows, accordingly.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:

participating in an online collaborative computing session by a presenter device to share applications executing at the presenter device with one or more attendee devices;

determining one or more displayed windows on the presenter device, wherein a window is a graphical user interface element generated by an application;

providing individual window sharing selectability for the presenter device, each individual window being selected as shared or unshared;

providing entire application sharing selectability for the presenter device that is a separate selectable feature in relation to the individual window sharing selectability, each application being selected as shared, unshared, or neither shared nor unshared, the entire application sharing selectability taking priority over individual window sharing selections, wherein all windows of a shared application are shared windows and all windows of an unshared application are unshared windows regardless of the individual window sharing selections of the corresponding windows for the respective parent applications;

determining a set of shared windows of the presenter device that are to be shared with the attendee devices and a set of unshared windows of the presenter device that are not to be shared with the attendee devices based on individual window sharing selections and entire application sharing selections; and sharing the set of shared windows at the presenter device with the attendee devices, without sharing the set of unshared windows.

2. The method as in claim 1, further comprising:

generating a list of the one or more displayed windows at the presenter device;

providing the individual window sharing and entire application sharing selectability through the list; and determining the set of shared windows and set of unshared windows based on the individual window sharing selections and entire application sharing selections within the list.

3. The method as in claim 2, wherein prompting comprises:

providing at least one of a checkbox, an option selection, a drop-down menu, and a clickable option within the list for each individual window and application.

4. The method as in claim 1, wherein providing selectability comprises:

prompting a presenter to select whether each individual window and each application is to be shared or not shared.

5. The method as in claim 1, further comprising:

determining that an unshared window covers a portion of a shared window; and hiding the portion of the shared window covered by the unshared window from the attendee devices.

6. The method as in claim 1, wherein sharing comprises:

determining a shared visual region of a shared window; and transmitting that shared visual region to the attendee devices.

7. The method as in claim 6, further comprising:

determining an unshared visual region of unshared windows; and blocking that unshared visual region from being shared if that unshared visual region covers the shared visual region.

8. The method as in claim 6, wherein determining the shared visual region comprises:

monitoring visual function calls for an application to draw a particular window; and determining where the application draws the window based on the visual function calls.

9. The method as in claim 1, further comprising:

determining that a new window is created on the presenter device; and in response, prompting a presenter to address a sharing selection of the new window if the new window is created by a parent application that has not been selected as either shared or unshared.

10. The method as in claim 9, wherein the presenter is prompted prior to sharing the new window with the attendee devices.

11. The method as in claim 1, further comprising:

rendering individual window sharing selectability inoperative in response to a shared or unshared selection of a corresponding parent application.

12. The method as in claim 1, further comprising:

graying out each of one or more unshared windows on a display of the presenter device.

13. The method as in claim 1, wherein providing individual window sharing selectability comprises:

providing individual parent window sharing selectability, each individual parent window being selected as individually shared, individually unshared, entirely shared, or entirely unshared;

providing individual child window sharing selectability, each individual child window being selected as shared or unshared, a parent window selection as entirely shared or entirely unshared taking priority over individual child window sharing selections, wherein all child windows of an entirely shared parent window are shared windows and all child windows of an entirely unshared parent window are unshared windows regardless of the corresponding individual child window sharing selections.

14. The method as in claim 13, further comprising:

rendering individual child window sharing selectability inoperative in response to an entirely shared or entirely unshared selection of a corresponding parent window.

15. The method as in claim 13, further comprising:

providing individual parent window sharing selectability and individual child window sharing selectability through a generated list of the one or more displayed windows at the presenter device.

16. An apparatus, comprising:

one or more network interfaces adapted to transmit and receive data on a computer network;

a processor coupled to the network interfaces and adapted to execute one or more processes; and a memory configured to store a presenter collaboration process executable by the processor, the presenter collaboration process when executed operable to:

participate in an online collaborative computing session to share executed applications with one or more attendee devices;

determine one or more displayed windows of the applications, wherein a window is a graphical user interface element generated by an application;

provide individual window sharing selectability, each individual window being selected as shared or unshared;

provide entire application sharing selectability that is a separate selectable feature in relation to the individual window sharing selectability, each application being selected as shared, unshared, or neither shared nor unshared, the entire application sharing selectability taking priority over individual window sharing selections, wherein all windows of a shared application are shared windows and all windows of an unshared application are unshared windows regardless of the individual window sharing selections of the corresponding windows for the respective parent applications;

determine a set of shared windows that are to be shared with the attendee devices and a set of unshared windows that are not to be shared with the attendee devices based on individual window sharing selections and entire application sharing selections; and share the set of shared windows at the presenter device with the attendee devices, without sharing the set of unshared windows.

17. The apparatus as in claim 16, wherein the presenter collaboration process when executed to share is further operable to:

determine a shared visual region of shared windows;
determine an unshared visual region of unshared windows;
transmit the shared visual region to the attendee devices; and
block the unshared visual region from being shared if that unshared visual region covers the shared visual region.

18. The apparatus as in claim 16, wherein the presenter collaboration process when executed is further operable to:

determine that a new window is created; and in response,
prompt a sharing selection of the new displayed window if the new window is created by a parent application that has not been selected as either shared or unshared.

19. The apparatus as in claim 16, wherein the presenter collaboration process when executed is further operable to:

render individual window sharing selectability inoperative in response to a shared or unshared selection of a corresponding parent application.

20. The apparatus as in claim 16, wherein the presenter collaboration process when executed to provide individual window sharing selectability is further operable to:

provide individual parent window sharing selectability, each individual parent window being selected as individually shared, individually unshared, entirely shared, or entirely unshared;

provide individual child window sharing selectability, each individual child window being selected as shared or unshared, a parent window selection as entirely shared or entirely unshared taking priority over individual child window sharing selections, wherein all child windows of an entirely shared parent window are shared windows and all child windows of an entirely unshared parent window are unshared windows regardless of the corresponding individual child window sharing selections.

21. The apparatus as in claim 16, wherein the presenter collaboration process when executed is further operable to:

generate a list of the one or more displayed windows at the presenter device;
provide sharing selectability through the list; and
determine the set of shared windows and set of unshared windows based on the sharing selections within the list.

22. A tangible computer-readable media having software encoded thereon, the software when executed on a device operable to:

participate in an online collaborative computing session to share executed applications with one or more attendee devices;

determine one or more displayed windows of the applications, wherein a window is a graphical user interface element generated by an application;

provide individual window sharing selectability, each individual window being selected as shared or unshared;

provide entire application sharing selectability that is a separate selectable feature in relation to the individual window sharing selectability, each application being selected as shared, unshared, or neither shared nor unshared, the entire application sharing selectability taking priority over individual window sharing selections, wherein all windows of a shared application are shared windows and all windows of an unshared application are unshared windows regardless of the individual window sharing selections of the corresponding windows for the respective parent applications;

determine a set of shared windows that are to be shared with the attendee devices and a set of unshared windows that are not to be shared with the attendee devices based on individual window sharing selections and entire application sharing selections; and share the set of shared windows at the presenter device with the attendee devices, without sharing the set of unshared windows.

23. The computer-readable media as in claim 22, wherein the software when executed to provide individual window sharing selectability is further operable to:

provide individual parent window sharing selectability, each individual parent window being selected as individually shared, individually unshared, entirely shared, or entirely unshared;

provide individual child window sharing selectability, each individual child window being selected as shared or unshared, a parent window selection as entirely shared or entirely unshared taking priority over individual child window sharing selections, wherein all child windows of an entirely shared parent window are shared windows and all child windows of an entirely unshared parent window are unshared windows regardless of the corresponding individual child window sharing selections.

24. The computer-readable media as in claim 22, wherein the software when executed is further operable to:

generate a list of the one or more displayed windows at the device;
provide sharing selectability through the list; and
determine the set of shared windows and set of unshared windows based on the sharing selections within the list.

* * * * *